(12) United States Patent
Keith et al.

(10) Patent No.: US 6,652,235 B1
(45) Date of Patent: Nov. 25, 2003

(54) METHOD AND APPARATUS FOR REDUCING TURBINE BLADE TIP REGION TEMPERATURES

(75) Inventors: Sean Robert Keith, Fairfield, OH (US); Thomas Edward DeMarche, Boxford, MA (US); John Robert Staker, Cincinnati, OH (US); Judd Dodge Tressler, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/160,527

(22) Filed: May 31, 2002

(51) Int. Cl.[7] .................................................. F01D 5/18
(52) U.S. Cl. ........................................ 416/92; 416/97 R
(58) Field of Search .......................... 415/115; 416/92, 416/97 R; 29/889.2

(56) References Cited

U.S. PATENT DOCUMENTS

| | | | | |
|---|---|---|---|---|
| 4,589,824 A | | 5/1986 | Kozlin | |
| 5,261,789 A | * | 11/1993 | Butts et al. | 416/96 R |
| 5,503,527 A | | 4/1996 | Lee et al. | |
| 6,164,914 A | | 12/2000 | Correia et al. | |
| 6,179,556 B1 | | 1/2001 | Bunker | |
| 6,190,129 B1 | * | 2/2001 | Mayer et al. | 416/97 R |
| 6,382,913 B1 | * | 5/2002 | Lee et al. | 416/96 R |

* cited by examiner

*Primary Examiner*—Ninh H. Nguyen
(74) *Attorney, Agent, or Firm*—William Scott Andes; Armstrong Teasdale LLP; Robert B. Reeser, III

(57) ABSTRACT

A method for fabricating a rotor blade for a gas turbine engine facilitates reducing operating temperatures of a tip portion of the rotor blade. The method comprises forming an airfoil including a first sidewall and a second sidewall connected at a leading edge and a trailing edge to define a cavity therein, wherein the first and second sidewalls extend radially between a rotor blade root and a rotor blade tip plate, and forming a first tip wall extending from the rotor blade tip plate along the first sidewall, such that at least a portion of the first tip wall is at least partially recessed with respect to the rotor blade first sidewall to define a tip shelf that extends from the airfoil trailing edge towards the airfoil leading edge. A second tip wall is formed to extend from the rotor blade tip plate along the second sidewall.

18 Claims, 3 Drawing Sheets

METHOD AND APPARATUS FOR REDUCING TURBINE BLADE TIP REGION TEMPERATURES

BACKGROUND OF THE INVENTION

This application relates generally to gas turbine engine rotor blades and, more particularly, to methods and apparatus for reducing rotor blade tip temperatures.

Gas turbine engine rotor blades typically include airfoils having leading and trailing edges, a pressure side, and a suction side. The pressure and suction sides connect at the airfoil leading and trailing edges, and span radially between the airfoil root and the tip, such that a cooling cavity is defined therein. To facilitate reducing combustion gas leakage between the airfoil tips and stationary stator components, the airfoils include a tip region that extends radially outward from the airfoil tip.

The airfoil tip regions include a first tip wall extending from the airfoil leading edge to the trailing edge, and a second tip wall also extending from the airfoil leading edge to connect with the first tip wall at the airfoil trailing edge. The tip region prevents damage to the airfoil if the rotor blade rubs against the stator components.

During operation, combustion gases impacting the rotating rotor blades transfer heat into the blade airfoils and tip regions. Over time, continued operation in higher temperatures may cause the airfoil tip regions to thermally fatigue. To facilitate reducing operating temperatures of the airfoil tip regions, at least some known rotor blades include slots within the tip walls to permit combustion gases at a lower temperature to flow through the tip regions.

To facilitate minimizing thermal fatigue to the rotor blade tips, at least some known rotor blades employ a plurality of tip openings which enable cooling air to discharge from the cooling cavity for cooling the rotor blade tips. After assembly in the rotor, the rotor blades are typically ground as an assembly to a specified diameter for the rotor. During the assembly grind, and during engine operation, the tip openings may become smeared shut, thus decreasing an amount of cooling air that may be discharged from the cooling cavity for cooling the rotor blade tips. Rotor operation with rotor blade tip openings that have been smeared shut may increase the operating temperature of the rotor blade tips, which may result in an increased amount of thermal creep, plastic deformation, and oxidation formation within the trailing edge tip region. Over time, continued operation with rotor blade tip openings that have been smeared shut may decrease the useful life of the rotor assembly.

BRIEF SUMMARY OF THE INVENTION

In one aspect of the invention, a method for fabricating a rotor blade for a gas turbine engine to facilitate reducing operating temperatures of a tip portion of the rotor blade is provided. The method comprises forming an airfoil including a first sidewall and a second sidewall connected at a leading edge and a trailing edge to define a cavity therein, wherein the first and second sidewalls extend radially between a rotor blade root and a rotor blade tip, and forming a first tip wall extending from the rotor blade tip plate along the first sidewall, such that at least a portion of the first tip wall is at least partially recessed with respect to the rotor blade first sidewall to define a tip shelf that extends from the airfoil trailing edge towards the airfoil leading edge. The method also comprises forming a second tip wall extending from the rotor blade tip plate along the second sidewall such that the second tip wall connects with the first tip wall at the rotor blade trailing edge.

In a further aspect, an airfoil for a gas turbine engine is provided. The airfoil includes a leading edge, a trailing edge, a tip plate, a first sidewall, a second sidewall, a first tip wall, and a second tip wall. The first tip wall extends in radial span between an airfoil root and the tip plate. The second sidewall is connected to the first sidewall at the leading edge and the trailing edge to define a cavity therein. The second sidewall extends in radial span between the airfoil root and the tip plate. The first tip wall extends radially outward from the tip plate along the first sidewall. The second tip wall extends radially outward from the tip plate along the second sidewall. The first tip wall is connected to the second tip wall at the leading edge. The first tip wall is at least partially recessed with respect to the rotor blade first sidewall to define a tip shelf that extends from the airfoil trailing edge towards the airfoil leading edge. The tip shelf includes at least one opening extending therethrough to the cavity.

In another aspect of the invention, a gas turbine engine including a plurality of rotor blades is provided. Each rotor blade includes an airfoil including a leading edge, a trailing edge, a first sidewall, a second sidewall, a first tip wall, and a second tip wall. The airfoil first and second sidewalls are connected axially at the leading and trailing edges to define a cavity within the airfoil. The first and second sidewalls extend radially from a blade root to the tip plate. The first tip wall extends radially outward from the tip plate along the first sidewall. The second tip wall extends radially outward from the tip plate along the second sidewall. The first tip wall is at least partially recessed with respect to the rotor blade first sidewall to define a tip shelf that extends from the airfoil trailing edge towards the airfoil leading edge. The tip shelf includes at least one opening extending therethrough to the airfoil cavity.

DETAILED DESCRIPTION OF THE INVENTION

Figure 1:
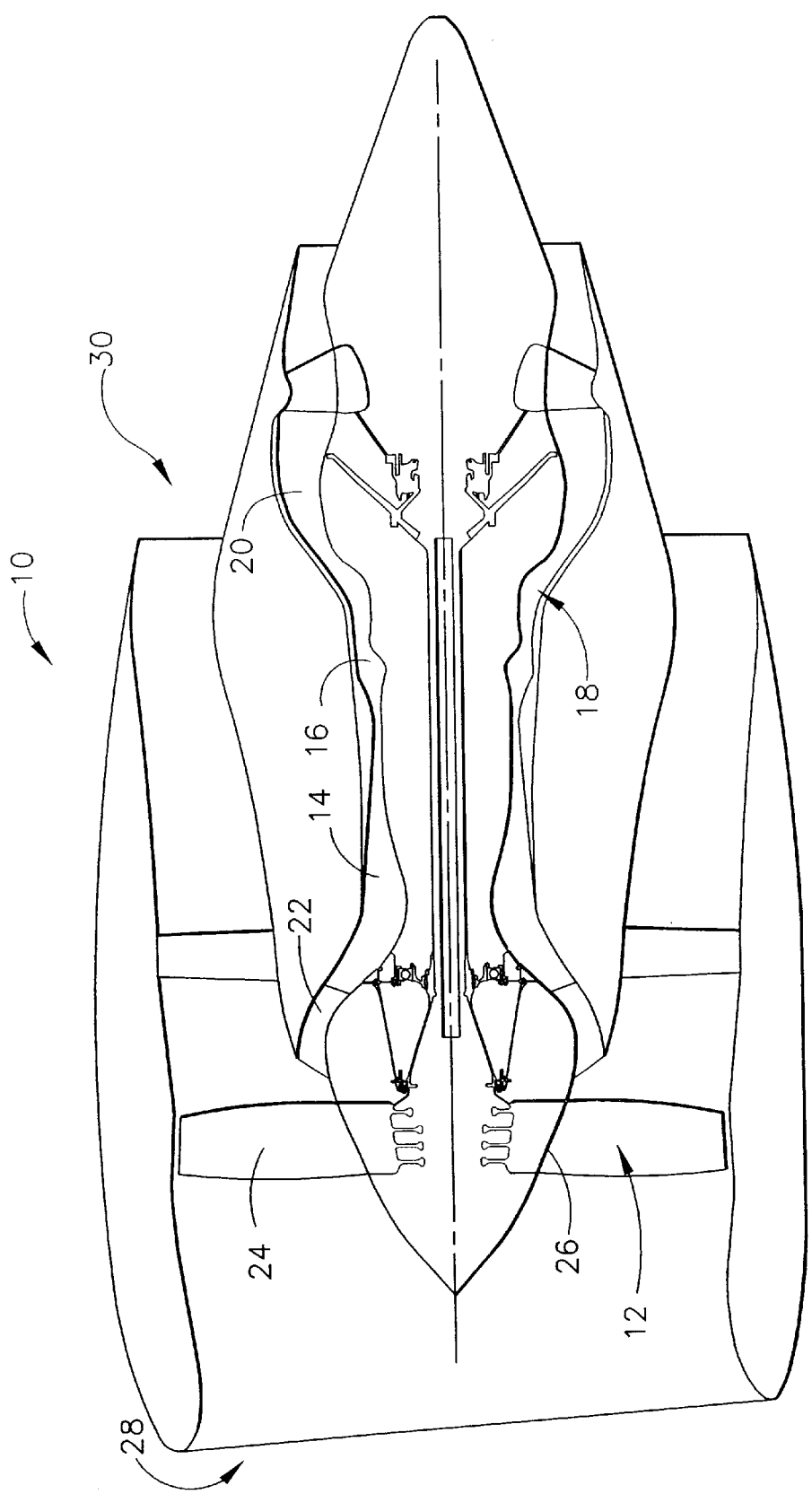
FIG. 1 is a schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, engine 10 is a CT7 engine commercially available from General Electric Aircraft Engines, Cincinnati, Ohio.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
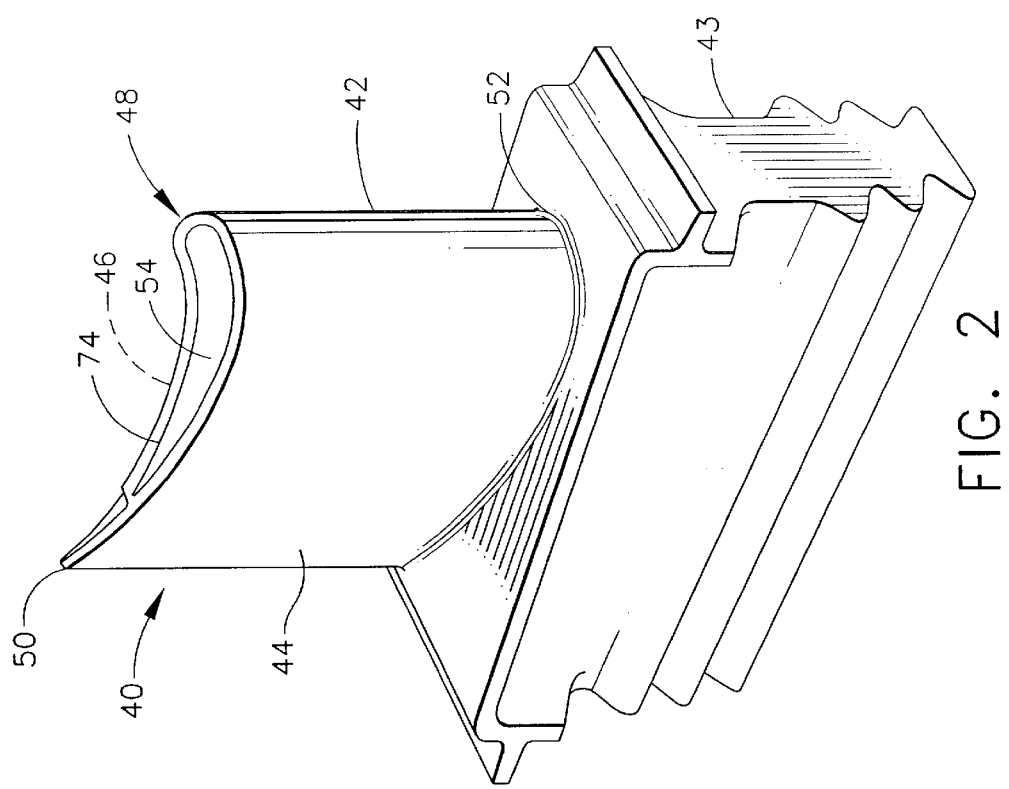
FIG. 2 is a perspective view of a rotor blade that may be used with the gas turbine engine shown in FIG. 1.
Figure 3:
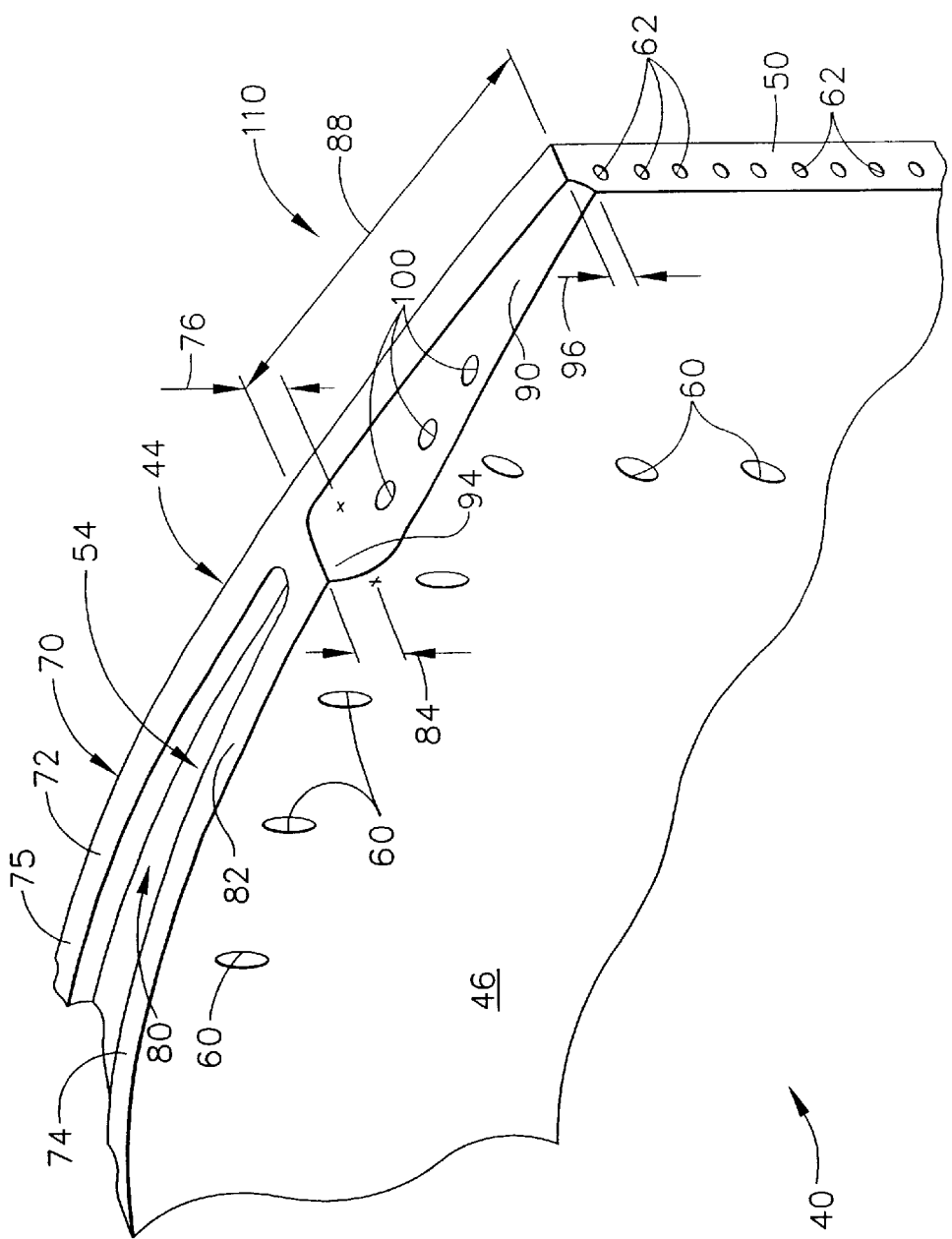
FIG. 3 is an enlarged partial perspective view of a portion of the rotor blade shown in FIG. 2.

FIG. 2 is a perspective view of a rotor blade 40 that may be used with gas turbine engine 10 (shown in FIG. 1). FIG. 3 is an enlarged partial perspective view of a portion of rotor blade 40. In one embodiment, a plurality of rotor blades 40 form a high pressure turbine rotor blade stage (not shown) of gas turbine engine 10. Each rotor blade 40 includes a hollow airfoil 42 and an integral dovetail 43 used for mounting airfoil 42 to a rotor disk (not shown) in a known manner.

Airfoil 42 includes a first sidewall 44 and a second sidewall 46. First sidewall 44 is convex and defines a suction side of airfoil 42, and second sidewall 46 is concave and defines a pressure side of airfoil 42. Sidewalls 44 and 46 are connected at a leading edge 48 and at an axially-spaced trailing edge 50 of airfoil 42 that is downstream from leading edge 48.

First and second sidewalls 44 and 46, respectively, extend longitudinally or radially outward to span from a blade root 52 positioned adjacent dovetail 43 to a tip plate 54 which defines a radially outer boundary of an internal cooling chamber (not shown). The cooling chamber is defined within airfoil 42 between sidewalls 44 and 46. Internal cooling of airfoils 42 is known in the art. In one embodiment, the cooling chamber includes a serpentine passage cooled with compressor bleed air. In the exemplary embodiment, sidewall 46 includes a plurality of film cooling openings 60, extending therethrough to facilitate additional cooling of the cooling chamber and airfoil trailing edge 50.

Airfoil 42 also includes a plurality of trailing edge openings 62. More specifically, openings 62 extend radially between tip plate 54 and blade root 52 for discharging cooling fluid from the cooling chamber to facilitate cooling airfoil trailing edge 50.

A tip region 70 of airfoil 42 is sometimes known as a squealer tip, and includes a first tip wall 72 and a second tip wall 74 formed integrally with airfoil 42. First tip wall 72 extends from airfoil leading edge 48 along airfoil first sidewall 44 to airfoil trailing edge 50. More specifically, first tip wall 72 extends from tip plate 54 to an outer edge 75 for a height 76. In the exemplary embodiment, first tip wall height 76 is substantially constant along first tip wall 72. In alternative embodiments height 76 is not substantially constant along first tip wall 72.

Second tip wall 74 extends from airfoil leading edge 48 along second sidewall 46 towards airfoil trailing edge 50. More specifically, second tip wall 74 is connected to first tip wall 72 at airfoil leading edge 48 and extends aftward towards trailing edge 50. Because second tip wall 74 is laterally spaced from first tip wall 72, an open-top tip cavity 80 is defined with tip walls 72 and 74, and tip plate 54. Second tip wall 74 also extends radially outward from tip plate 54 to an outer edge 82 for a height 84. In the exemplary embodiment, second tip wall height 84 is approximately equal first tip wall height 76. Alternatively, second tip wall height 84 is not equal first tip wall height 76.

Second tip wall 74 is recessed at least in part from airfoil second sidewall 46. More specifically, second tip wall 74 is recessed from airfoil second sidewall 46 to couple with first tip wall 72 a distance 88 from airfoil trailing edge 50 such that a tip shelf 90 is defined. More specifically, tip shelf 90 extends aftward from a front edge 94, that is distance 88 from airfoil trailing edge 50, to trailing edge 50 adjacent first tip wall 72. Tip shelf 90 is a distance 96 from first tip wall outer edge 75. In the exemplary embodiment, distance 96 is approximately equal first tip shelf height 76 such that tip shelf 90 is substantially co-planar with tip plate 54. In alternative embodiments, tip shelf 90 is not substantially co-planar with tip plate 54.

In the exemplary embodiment, tip shelf 90 includes a plurality of tip openings 100 spaced axially along tip shelf 90. Openings 100 extend through tip shelf 90 for discharging cooling fluid from the cooling cavity for cooling airfoil trailing edge 50. More specifically, openings 100 are for discharging cooling fluid towards first tip wall 72 to facilitate reducing operating temperatures within the region 110 of first tip wall adjacent trailing edge 50. In one embodiment, openings 100 extend obliquely, rather than normal, through tip shelf 90 to facilitate discharging cooling fluid at first tip wall region 110.

During operation, squealer tip walls 72 and 74 are positioned in close proximity with a conventional stationary stator shroud (not shown), and define a tight clearance (not shown) therebetween that facilitates reducing combustion gas leakage therethrough. Tip walls 72 and 74 extend radially outward from airfoil 42. Accordingly, if rubbing occurs between rotor blades 40 and the stator shroud, only tip walls 72 and 74 contact the shroud and airfoil 42 remains intact. Furthermore, if rubbing occurs, because tip shelf cooling openings 100 are a distance 96 from first tip wall outer edge 75, tip shelf distance 96 facilitates reducing smearing of tip shelf 90 and inadvertent sealing of openings 100.

Because combustion gases assume a parabolic profile flowing through a turbine flowpath at blade tip region leading edge 48, combustion gases near turbine blade tip region 70 are at a lower temperature than gases near a blade pitch line (not shown) of turbine blades 40. As combustion gases flow from blade tip region leading edge 48 towards blade trailing edge 50, hotter gases near the pitch line migrate radially towards rotor blade tip region 70 and first tip wall region 110 due to blade rotation.

Tip shelf 90 provides a discontinuity in airfoil pressure side 46 which causes the hotter combustion gases to separate from airfoil second sidewall 46, thus facilitating a decrease in heat transfer thereof. Additionally, tip shelf openings 100 enable cooling air to be discharged from the internal cooling chamber to provide additional film and convective cooling of trailing edge 50 and first tip wall region 110. Furthermore, sidewall film cooling openings 60 discharge additional film and convective cooling air from the cooling chamber to facilitate additional cooling of the cooling chamber and airfoil trailing edge 50. The combination of the film cooling and the convection cooling, known as a double row cooling scheme, facilitates reducing the operating temperature of trailing edge 50 and first tip wall region 110.

The above-described rotor blade is cost-effective and highly reliable. The rotor blade includes a tip shelf extending from the airfoil trailing edge towards the airfoil trailing edge. The tip shelf disrupts combustion gases flowing past the airfoil to facilitate the formation of a cooling layer against the tip shelf. As a result, cooler operating temperatures within the rotor blade facilitate extending a useful life of the rotor blades in a cost-effective and reliable manner.

While the invention has been described in terms of various specific embodiments, those skilled in the art will recognize that the invention can be practiced with modification within the spirit and scope of the claims.

What is claimed is:

1. A method for fabricating a rotor blade for a gas turbine engine to facilitate reducing operating temperatures of a tip portion of the rotor blade, said method comprising:

forming an airfoil including a first sidewall and a second sidewall connected at a leading edge and a trailing edge to define a cavity therein, wherein the first and second sidewalls extend radially between a rotor blade root and a rotor blade tip plate;

forming a first tip wall extending from the rotor blade tip plate along the first sidewall, such that at least a portion of the first tip wall is at least partially recessed with respect to the rotor blade first sidewall to define a tip shelf that extends from the airfoil trailing edge towards the airfoil leading edge;

forming a second tip wall extending from the rotor blade tip plate along the second sidewall such that the second tip wall connects with the first tip wall at the rotor blade leading edge; and forming at least one film cooling opening extending through the first sidewall.

2. A method in accordance with claim 1 wherein said step of forming a first tip wall further comprises forming the first tip wall to extend from a concave airfoil sidewall.

3. A method in accordance with claim 2 wherein said step of forming a first tip wall further comprises forming a plurality of film cooling openings extending from the tip shelf into the airfoil cavity.

4. A method in accordance with claim 3 wherein said step of forming an airfoil further comprises forming a plurality of cooling openings along the trailing edge to extend radially between the airfoil tip shelf and the blade root.

5. A method in accordance with claim 2 wherein said step of forming a first tip wall extending from the rotor blade tip plate further comprises forming the first tip wall such that the tip shelf defined is substantially co-planar with the tip plate.

6. An airfoil for a gas turbine engine, said airfoil comprising:

a leading edge;

a trailing edge;

a tip plate;

a first sidewall extending in radial span between an airfoil root and said tip plate, said first sidewall comprising a plurality of film cooling openings extending therethrough;

a second sidewall connected to said first sidewall at said leading edge and said trailing edge to define a cavity therein, said second sidewall extending in radial span between the airfoil root and said tip plate;

a first tip wall extending radially outward from said tip plate along said first sidewall; and a second tip wall extending radially outward from said tip plate along said second sidewall, said first tip wall connected to said second tip wall at said leading edge, said first tip wall at least partially recessed with respect to said rotor blade first sidewall to define a tip shelf extending from said airfoil trailing edge towards said airfoil leading edge, said tip shelf comprising at least one opening extending therethrough to said cavity.

7. An airfoil in accordance with claim 6 wherein said first tip wall and said second tip wall are substantially equal in height.

8. An airfoil in accordance with claim 6 wherein said tip shelf comprises a plurality of film cooling openings.

9. An airfoil in accordance with claim 6 wherein said trailing edge comprises a plurality of trailing edge cooling openings.

10. An airfoil in accordance with claim 6 wherein said rotor blade airfoil first sidewall is substantially concave, said rotor blade airfoil second sidewall is substantially convex.

11. An airfoil in accordance with claim 6 wherein said tip shelf is substantially co-planar with said tip plate.

12. A gas turbine engine comprising a plurality of rotor blades, each said rotor blade comprising an airfoil comprising a leading edge, a trailing edge, a first sidewall, a second sidewall, a first tip wall, and a second tip wall, said airfoil first and second sidewalls connected axially at said leading and trailing edges to define a cavity within said airfoil, said first and second sidewalls extending radially from a blade root to a tip plate, said first sidewall comprising a plurality of film cooing openings, said first tip wall extending radially outward from said tip plate along said first sidewall, said second tip wall extending radially outward from said tip plate along said second sidewall, said first tip wall at least partially recessed with respect to said rotor blade first sidewall to define a tip shelf extending from said airfoil trailing edge towards said airfoil leading edge, said tip shelf comprising at least one opening extending therethrough to said airfoil cavity.

13. A gas turbine engine in accordance with claim 12 wherein said rotor blade airfoil first sidewall is substantially concave, said rotor blade airfoil second sidewall is substantially convex.

14. A gas turbine engine in accordance with claim 13 wherein said rotor blade airfoil first tip wall and said airfoil second tip wall are substantially equal in height.

15. A gas turbine engine in accordance with claim 13 wherein said rotor blade airfoil first tip wall extends a first distance from said tip plate, said rotor blade airfoil second tip wall extends a second distance from said tip plate.

16. A gas turbine engine in accordance with claim 13 wherein said rotor blade airfoil tip shelf comprises a plurality of film cooling openings.

17. A gas turbine engine in accordance with claim 13 wherein said rotor blade airfoil trailing edge comprises a plurality of trailing edge cooling openings extending radially between said blade root and said rotor blade tip plate.

18. A gas turbine engine in accordance with claim 13 wherein said rotor blade airfoil tip shelf is substantially co-planar with said rotor blade tip plate.

\* \* \* \* \*

UNITED STATES PATENT AND TRADEMARK OFFICE
CERTIFICATE OF CORRECTION

PATENT NO.     : 6,652,235 B1
DATED          : November 25, 2003
INVENTOR(S)    : Keith et al.

It is certified that error appears in the above-identified patent and that said Letters Patent is hereby corrected as shown below:

Column 6,
Line 22, delete "cooing" and insert therefor -- cooling --.

Signed and Sealed this

Twenty-ninth Day of June, 2004

JON W. DUDAS
*Acting Director of the United States Patent and Trademark Office*